United States Patent
Yang et al.

(10) Patent No.: US 7,417,663 B2
(45) Date of Patent: Aug. 26, 2008

(54) VIDEOCONFERENCING SERVICE SYSTEM, VIDEOCONFERENCING SERVICE OPERATING METHOD AND SERVICE CENTER

(75) Inventors: Yuefeng Yang, Shenzhen (CN); Chongjun Chen, Shenzhen (CN); Jun Li, Shenzhen (CN); Xudong Lv, Shenzhen (CN); Mingyi Dai, Shenzhen (CN); Haijiao Ji, Shenzhen (CN); Binglin Xu, Shenzhen (CN)

(73) Assignee: Huawei Technologies Co., Ltd. (CN)

( * ) Notice: Subject to any disclaimer, the term of this patent is extended or adjusted under 35 U.S.C. 154(b) by 755 days.

(21) Appl. No.: 10/502,198

(22) PCT Filed: Jan. 23, 2002

(86) PCT No.: PCT/CN02/00038

§ 371 (c)(1),
(2), (4) Date: Jul. 21, 2004

(87) PCT Pub. No.: WO03/063485

PCT Pub. Date: Jul. 31, 2003

(65) Prior Publication Data

US 2005/0062842 A1    Mar. 24, 2005

(51) Int. Cl.
*H04N 7/14* (2006.01)
*H04L 12/16* (2006.01)

(52) U.S. Cl. .............. 348/14.09; 348/14.08; 348/14.12; 370/260

(58) Field of Classification Search ... 348/14.01–14.09, 348/14.1, 14.11, 14.12, 14.13; 370/260, 370/261; 709/204
See application file for complete search history.

(56) References Cited

U.S. PATENT DOCUMENTS

| | | | |
|---|---|---|---|
| 5,680,392 A | | 10/1997 | Semaan |
| 5,764,750 A | * | 6/1998 | Chau et al. ............... 379/229 |
| 5,943,321 A | | 8/1999 | St-Hilaire et al. |
| 5,963,547 A | | 10/1999 | O'Neil et al. |
| 5,991,796 A | | 11/1999 | Anupam et al. |
| 6,182,073 B1 | | 1/2001 | Kukkal |
| 6,212,572 B1 | * | 4/2001 | Aydin et al. ............. 719/312 |
| 6,574,194 B1 | * | 6/2003 | Sun et al. ................ 370/235 |

FOREIGN PATENT DOCUMENTS

| | | |
|---|---|---|
| WO | WO9859461 A | 12/1998 |
| WO | WO0135655 A | 5/2001 |

* cited by examiner

*Primary Examiner*—Melur Ramakrishnaiah (57) ABSTRACT

A videoconferencing service operating method and the videoconferencing service system thereof in which Multipoint Control Units communicate with videoconferencing terminals through a communication network is disclosed in this invention, it is characterized that through a computer network, MCUs are connected with a service center that accepts and processes videoconferencing service request, dispatches MCUs resource, manages centrally and drives videoconferencing service. A service center that is used in the said videoconferencing service operating method and system includes a Web server that receives a subscriber service request on a network, a service-processing module that receives subscriber messages sent centrally by the said Web server and dispatches MCUs resources on the computer network.

18 Claims, 5 Drawing Sheets

VIDEOCONFERENCING SERVICE SYSTEM, VIDEOCONFERENCING SERVICE OPERATING METHOD AND SERVICE CENTER

FIELD OF THE TECHNOLOGY

The invention generally relates to the multimedia communication field, especially to the videoconferencing.

BACKGROUND OF THE INVENTION

Videoconferencing service provides distance multimedia service including video, audio and data. With videoconferencing service, when people communicates with each other in different places, voices of the participants can be heard and their images can be seen; thus the communication fills with feeling of reality, closeness and on location. Videoconferencing service can be used in military, politic, economic, education and health fields; the advantages of reality, high efficiency and real-time will give people an effective manner for communication, management and collaborative decision-making.

Figure 1:
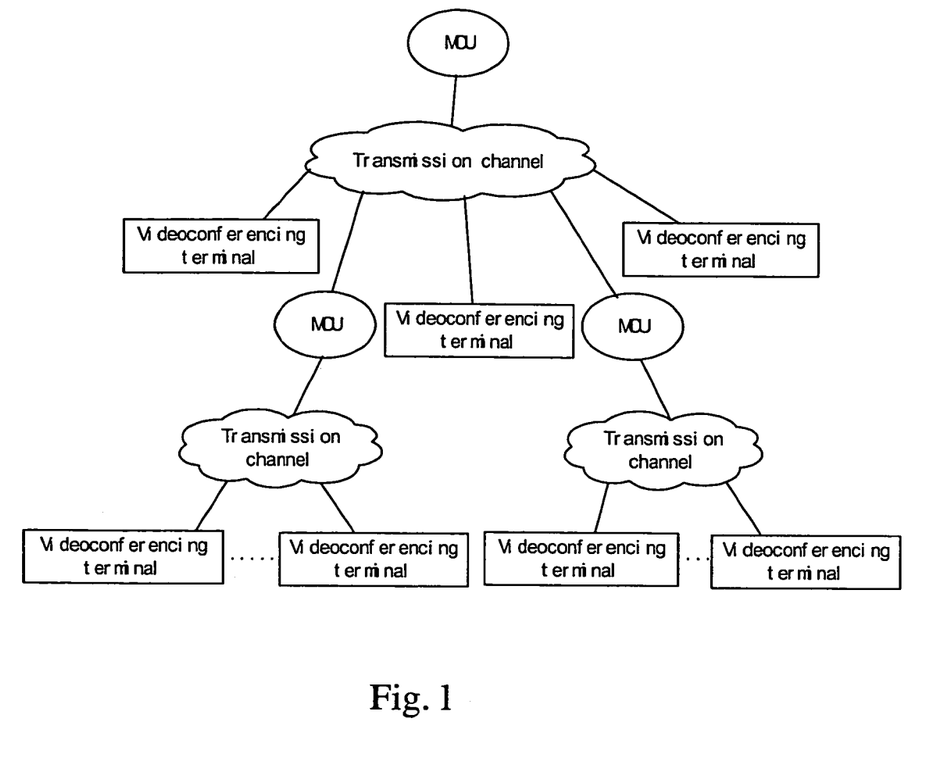
FIG. 1 shows a videoconferencing system in prior art.

The videoconferencing service is a communication mean which is used for having a meeting among two or several places through transmission channel by means of video technology and devices. As shown in FIG. 1, in general, a videoconferencing system includes videoconferencing terminals, transmission channels and multi-point control units (MCUs); they will be described in the following.

A videoconferencing terminal is directly operated by the subscriber and provides input and output of video, audio and data signals to the videoconferencing system; a videoconferencing terminal includes a video input/output device, an audio input/output device, a terminal processor and a terminal management system, and optionally includes peripherals such as a power amplifier device, a big screen or an electronic white board etc.

A videoconferencing terminal, on the one hand, samples, compresses, codes and multiplexes the video, audio and data signals at the videoconference site in real time, and then transmits to a transmission channel; on the other hand, classifies, decodes and recovers the received signal to the original video, audio and data signals. Besides, a videoconferencing terminal also transmits control signals of the videoconference at local site, such as request to speak, request the videoconference control claim etc., to the MCU, and executes commands sent by the MCU.

As shown in FIG. 1, in the present technology the MCU is the control kernel of a videoconferencing system. When a videoconference has more than two participants, i.e. two videoconferencing terminals, it must be controlled by a MCU, and all videoconferencing terminals are connected to the MCU with standard interface; the MCU implements exchange and mixture of the video and audio signals according to the international standard protocols, such as H.221, H.242, H.243 and T.120. In general, a MCU is consisted of two parts: a central processing unit and a console; the central processing unit implements functions specified in the protocols and the console implements a man-machine interface where the operator sends commands and operations to the MCU; when the videoconferencing service is opened to the public, a service room is needed to implement videoconference registration, reservation and billing etc.

In a videoconferencing system, it is necessary that there is a communication network to connect videoconferencing terminals and MCUs; physically, these transmission channels may be a fiber, a cable, a microwave mode or a satellite mode. Usually communication networks for a videoconferencing system are: the Public Switched Telephone Network (PSTN), the Packet Switched Public Data Network (PSPDN) and the Digital Data Network (DDN) etc.; at present with the ATM technology, some broadband networks, such as B-ISDN, IP network and IQ network may be used for videoconferencing service. Along with popularization of the ISDN and Internet network, application of the videoconferencing service is spread.

Nevertheless, the present videoconferencing system lacks effective management mechanism on great capability, thereby the capability of the MCU cannot be extended on the great scale; they can be only used for a small number of services so that utilization efficiency of the network is low. In this case, it is difficult to open videoconferencing service to the public.

SUMMARY OF THE INVENTION

Objective of the invention is to provide a videoconferencing system, a videoconferencing operating method and a service center that can expand the capability of MCUs, harmonize their works and improve utilization efficiency of videoconferencing system so that it is opened to the public.

The invention provides a videoconferencing operating method in which the MCUs communicate with videoconferencing terminals through a communication network; it is characterized that in the method a service center that accepts and processes videoconferencing service request, dispatches MCUs resources, manages and drives videoconferencing service, is connected with MCUs through a computer network.

The said service center of the invention includes: a Web server that receives a subscriber service request on a network, a service-processing module that receives subscriber information sent by the Web server and dispatches MCUs resources through the said computer network.

The invention provides a videoconferencing system that includes videoconferencing terminals, and MCUs, which are connected through communication networks; it is characterized that the said videoconferencing system further includes a service center that is connected with MCUs through a computer network, and accepts and processes videoconferencing service request, dispatches MCUs resources, manages and drives videoconferencing service.

The invention proposes a videoconferencing system, a operating method and a service center, where a service center that accepts and processes videoconferencing service request, dispatches MCUs resources, manages and drives videoconferencing service, is connected with MCUs through a computer network. By this way, videoconferencing service is opened to the public and capability of MCUs expedition is expanded, their works are harmonized and utilization efficiency of videoconferencing system is improved.

Specifically, in the conventional videoconferencing system and operating mode, every MCU has one console and a operator; but in the videoconferencing system of the invention, since there is a service center, so there are advantages as follows: the system need not any operator and can automatically work 24 hours a day; a service center can manage many MCUs simultaneously and centrally, so the maintenance personnel and equipment are reduced, and the service center also has a charging system and account system that are convenient for opening videoconferencing service to the public.

EMBODIMENTS OF THE INVENTION

The invention will be described in more detail with reference to drawings and embodiments.

Figure 2:
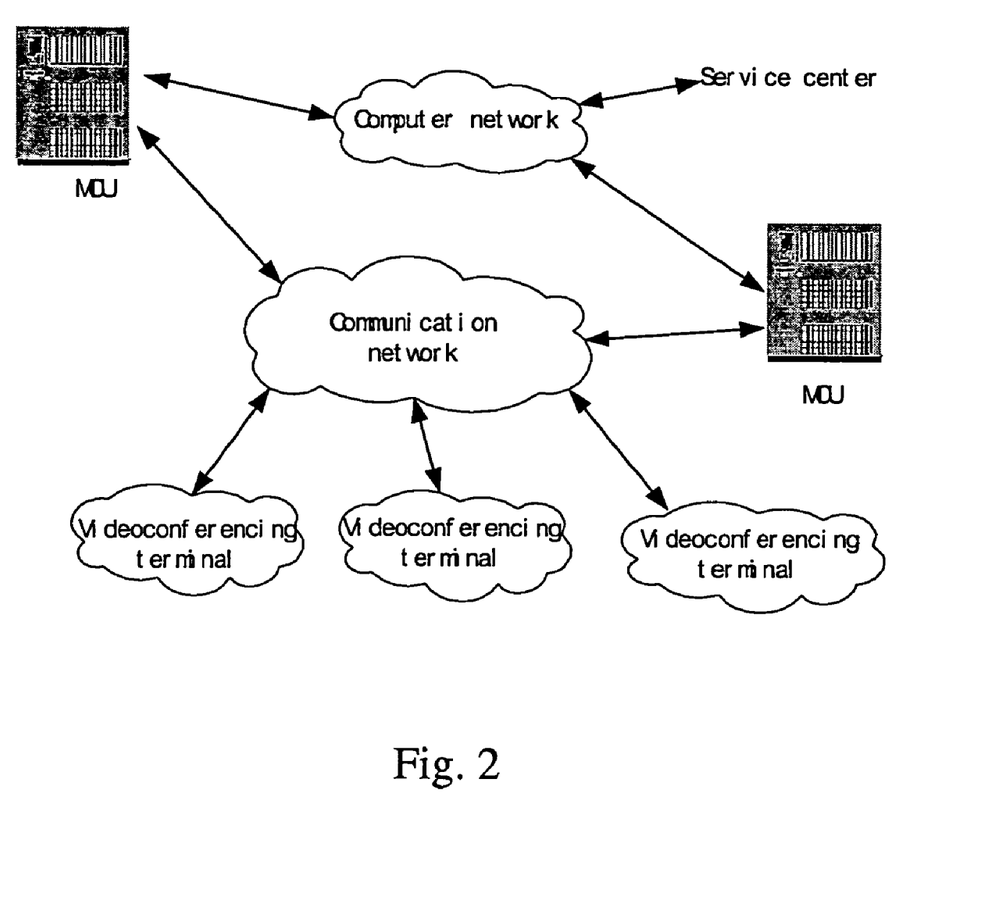
FIG. 2 shows a networking diagram of a videoconferencing system of the invention.

FIG. 2 shows a networking diagram of a videoconferencing system of the invention. As shown in the diagram, the system consists of five parts: a communication network, a computer network, multipoint control units (MCU), videoconferencing terminals and a service center.

The communication network supports the videoconferencing service; it may be an E1 dedicated network, a V35 dedicated network, an ISDN network, an IP network, an IQ network or other communication networks. The MCU used for accessing and processing the videoconferencing service requests from videoconferencing terminals is core process equipment; it is required that the MCU has a larger capacity, such as can be connected about 100 videoconferencing terminals. The videoconferencing terminal, which is purchased by a subscriber and used with a television, provides service to the subscriber. The service center is a control center that manages and drives videoconferencing service, and provides functions, such as videoconferencing service request processing, service acceptance, and charging etc. The computer network is a support network with which the service center manages MCUs, and it may be any computer network, such as TCP/IP network, LAN with or without TCP/IP protocol.

As shown in FIG. 2, the MCUs connect with videoconferencing terminals through the communication network, which may be an E1 dedicated network, a V35 dedicated network, an ISDN network, an IP network, an IQ network or other communication networks. Main thinking of the invention is that: setting a service center that accepts and processes the videoconferencing service request, dispatches the MCU resources, manages and drives centrally the videoconferencing services; communication between the service center and MCUs is a computer network.

The invention provides a videoconferencing operating method in which the MCUs communicate with videoconferencing terminals through a communication network; in the method a service center that accepts and processes videoconferencing service request, dispatches MCUs resources, manages and drives videoconferencing service, is connected with MCUs through a computer network.

It is better that the computer network is a TCP/IP network or a LAN.

It is better that communication between the service center and the MCUs deploys the Simple Network Management Protocol (SNMP).

It is better that the service center receives subscriber service requests on the network through a Web server; with a service-processing module the service center receives subscriber messages transmitted centrally by the Web server, and dispatches the MCU resources through the said computer network.

It is better that the service center stores data in a database.

It is better that the service-processing module deploys expandable multi-layer Client/Server architecture.

It is better that the connection (interface) between the Web server and the service center is a Socket with hold mode.

It is better that the operating method of the invention for videoconferencing services includes steps of:

(a) visiting a Web server with a browser to make a videoconference reservation;

(b) sending the videoconference reservation to the service-processing module by the Web server, initiating a dispatching procedure by the service-processing module; if the dispatching procedure is failure, returning a failure message of the videoconference reservation to the Web server by the service-processing module;

(c) At the starting time of the videoconference defined by the subscriber, informing the related MCU of convening the videoconference;

(d) At the ending time of the videoconference, informing the related MCU of ending the videoconference by the service-processing module.

It is better that the Web server creates a subscriber account number based on the subscriber service request, and provides services, including password updating, billing interrogation, to the subscribers.

It is better that the Web server provides subscribers management facilities by which a service provider manages subscribers including subscriber registration, subscriber profile update, subscriber deletion and subscriber information interrogation.

It is better that the Web server provides videoconference site management facilities with a videoconference site profile that is defined beforehand and stored in a database; when the videoconference is to be convened by a subscriber, the videoconference site that attend the videoconference can be selected from the database.

It is better that the Web server provides videoconferencing management facility that performs states transition among a videoconference state not to be dispatched, a videoconference state having been successfully dispatched, a videoconference state being convened, a videoconference being ended and a videoconference being interrupted.

It is better that the Web server provides charging management facilities that have videoconference charging service for the service provider and charge interrogation service for the subscriber.

It is better that the Web server provides notice service; a system administrator can broadcast message to an assistant and to subscribers through the internal notice board and external notice board, respectively.

The invention proposes a service center used for videoconferencing service operating in a videoconferencing system; the service center comprises a Web server that receives a subscriber service request on a network, a service-processing module that receives subscriber information sent centrally by the Web server and dispatches MCUs resources through a computer network.

It is better that the said computer network is a TCP/IP network or a LAN.

It is better that connection between the said Web server and the said server center is a socket with hold mode.

It is better that the said service center further has a database for storing data.

It is better that communication between the said service-processing module and MCUs deploys SNMP.

It is better that the said service-processing module includes: a source management module, a videoconference management module, a videoconference site management module, a subscriber management module and a charging module.

It is better that the said service-processing module deploys an expandable multi-layer Client/Server architecture.

The invention provides a videoconferencing system that includes videoconferencing terminals, and MCUs, which are connected through communication networks; the said videoconferencing system further includes a service center that is connected with MCUs through a computer network, and accepts and processes a videoconferencing service request, dispatches MCUs resources, manages and drives videoconferencing service.

It is better that the said communication network is a network based on ATM technology, an ISDN network or an IP network.

It is better that the said computer network is a TCP/IP network or a LAN.

It is better that communication between the said service center and MCUs deploys SNMP protocol.

It is better that the said service center includes: a Web server that receives a subscriber service request on a network, a service-processing module that receives subscriber information sent centrally by the Web server and dispatches MCUs resources on a computer network.

It is better that the said service center further has a database for storing data.

It is better that the said service-processing module deploys an expandable multi-layer Client/Server architecture.

Figure 3:
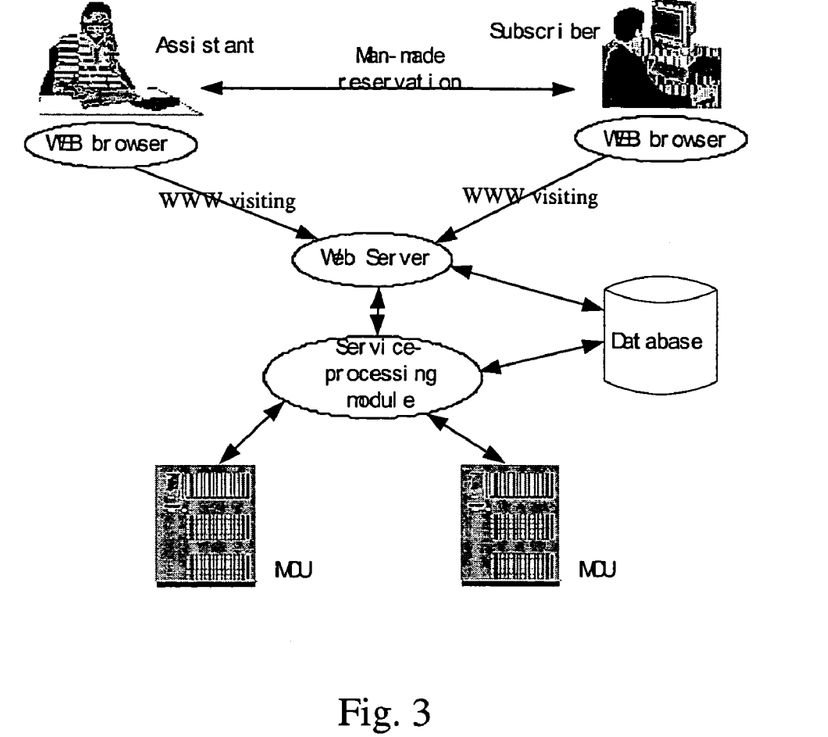
FIG. 3 shows a diagram of the service center in work status for first embodiment of the invention.

The service center needs to provide the function of accepting and processing service. A Web server receives and transfers the subscriber service requests to the service-processing module that manages the services, i.e. dispatches and controls the services. FIG. 3 shows first embodiment of the invention in which the service center is consisted of a Web server, a service-processing module and a database. The service center receives the subscriber service request either through the Web server on the network or through an assistant, then the service-processing module, which receives subscriber information sent centrally by the Web server, dispatches the MCUs resources through the said computer network; the data are stored in the database.

The system provides a Web server with which a subscriber can make a videoconference reservation in a network station mode in order to adapt for WWW. In order that the videoconference reservation information can be accepted by the MCU, it is necessary that there is a unique dispatching center. The system provides the said service-processing module that acts as the said unique dispatching center and is invisible to the subscribers and only used by the service provider for monitoring and control. The service-processing module, on the one hand, receives the subscriber information sent by the said Web server, and on the other hand, interacts with the MCUs after storing and dispatching the subscriber information. Thus, a communication protocol problem between the service-processing module and the MCUs provided by different vendors arises because of the deference protocol. By applying standard communication protocols, such as SNMP (Simple Network Management Protocol), this problem can be solved; the SNMP belongs to TCP/IP stack and is based on UDP (Subscriber Datagram Protocol).

Since the data to process in videoconferencing service is very large and also is important, the database is adopted to store the data in the system. In this embodiment, a database that is a part of the said service center. The database also performs data backup, data logical checking and other conventional database functions, such as data computing, data adding and deleting etc.

It can be seen from the above mention, in this embodiment the service center includes: a Web server, a service-processing module and a database. The Web server interacts with the subscriber directly; it processes the subscriber service request and returns the result including billing message etc.; the service-processing module performs mainly all the videoconferencing functions, especially the dispatching function, i.e. MCU resources allocation and videoconferencing control; the database performs data storing and data security manage etc.

Figure 4:
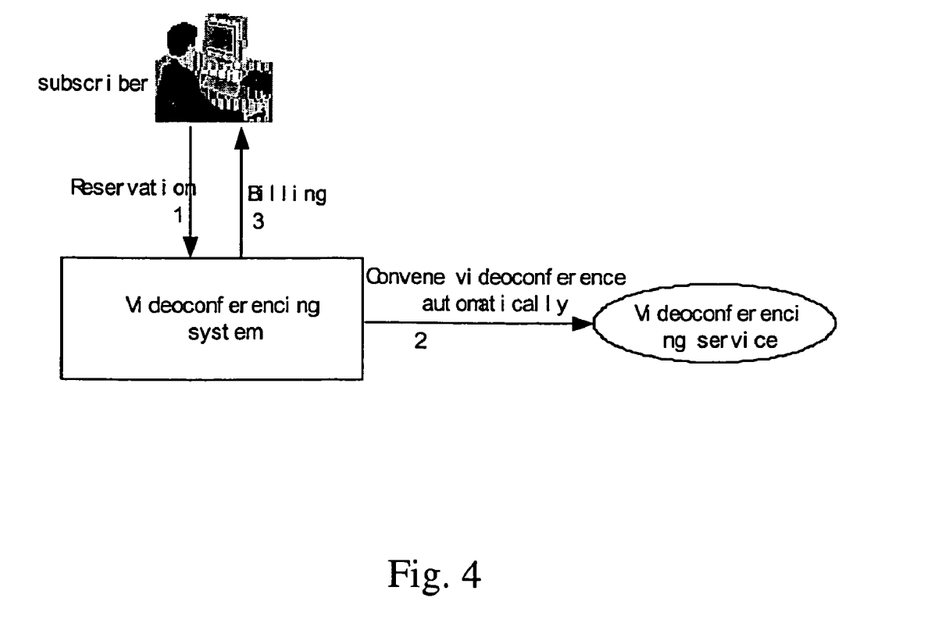
FIG. 4 shows videoconferencing service from a subscriber point of view for first embodiment of the invention.

FIG. 4 shows a videoconferencing service diagram of the first embodiment from a subscriber point of view. In FIG. 4, a subscriber make a videoconference reservation through a man-made mode or a Web mode; after a series processing made by the videoconferencing system, the videoconference will be automatically started at the time defined by the subscriber and the reserved videoconferencing terminals will be accessed; after the videoconference is ended, the charging of this videoconference will be calculated down within a defined time. In FIG. 4, the videoconferencing system includes MCUs, the communication network and operation management system etc.

In this embodiment, the Web server provides services as follow: creating an account number to every videoconferencing subscriber, updating a subscriber password and interrogating a subscriber billing; for subscriber management used by the service provider, including a subscriber registration, a subscriber profile update, a subscriber deletion and a subscriber status interrogation; for videoconference site management, including to store a videoconference site defined beforehand in the database, and when the videoconference is convened, selecting each videoconference site to attend the videoconference from the database to the convened videoconference; for videoconferencing management, including to process states transition of the videoconference state not to be dispatched, the videoconference state having been successful dispatched, the videoconference state being convened, the videoconference state having been ended and the videoconference being interrupted; for charging management, providing charging service to the service provider and billing interrogation to the subscribers; an internal notice board used for the system administrator to broadcast messages to the assistant; an external notice board used for the system administrator to broadcast messages to subscribers.

Figure 5:
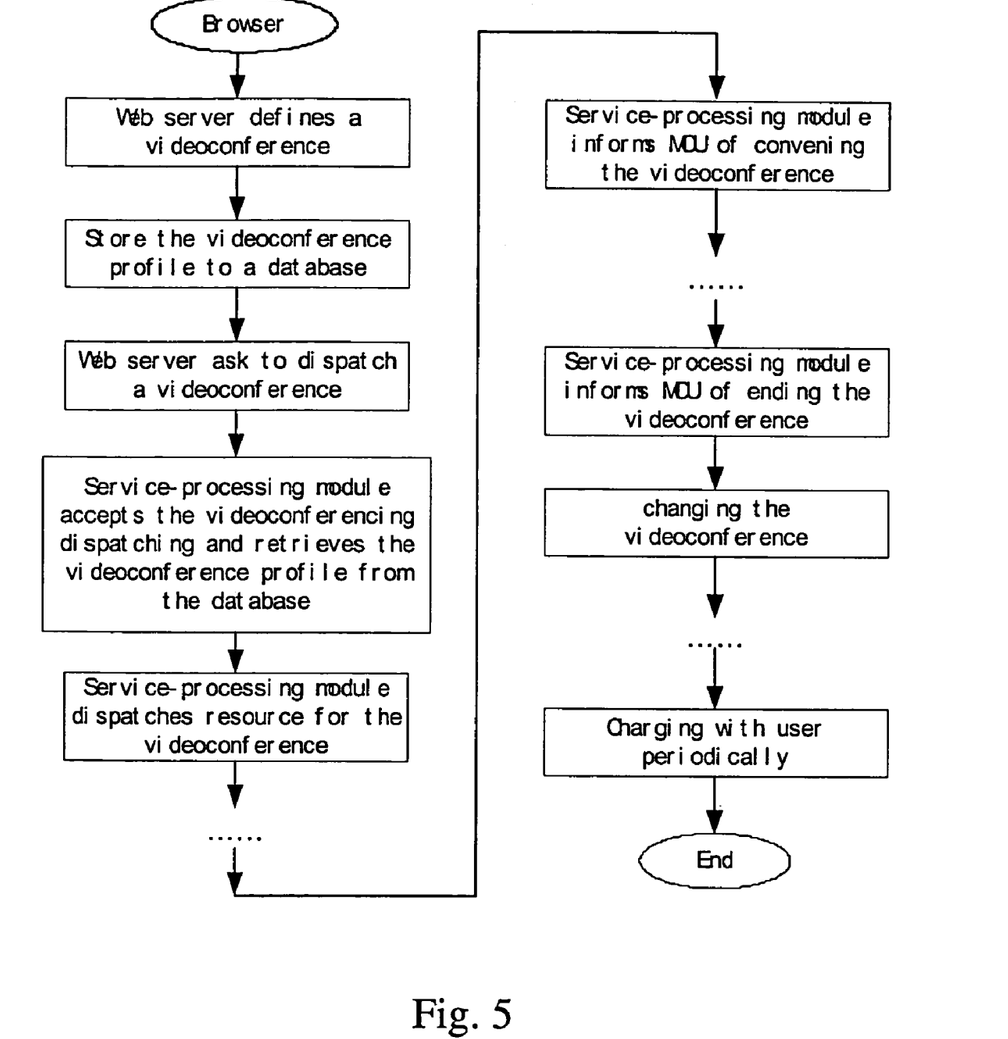
FIG. 5 shows a reservation flowchart of a videoconference for first embodiment of the invention.

FIG. 5 shows a reservation flowchart of the first embodiment of the invention. The flowchart includes the following steps:

(1) A subscriber visits the Web server to make a videoconference reservation through the browser;

(2) The Web server sends the reservation information to the service-processing module; the service-processing module initiates the dispatching mechanism; when the dispatching is failure, a reservation failure is returned to the Web server by the service-processing module;

(3) When the dispatching is successful, at the defined time, the related MCUs are informed about the videoconference being convened by the service-processing module;

(4) When the videoconference is ended, the service-processing module informs of the MCUs;

Waiting for charging and billing.

In this embodiment, a Web server is used for videoconferencing reservation; the advantages of this mode is as follow:

(1) A videoconferencing subscriber may make a videoconference reservation at any time and any place as long as Internet can be connected with;

(2) The subscriber can check his/her own billing, charging and use course recorders at any time and any place;

(3) The interface of network station is friendly so that operation is simple and convenience;

(4) A service provider can broadcast notices and messages to subscribers easily by network station, so not only more subscribers can be owned, but also information maintenance is reduced. For subscribers who cannot connect with Internet may go to a nearby service room to make a videoconferencing reservation by himself or herself or by an assistant.

Figure 6:
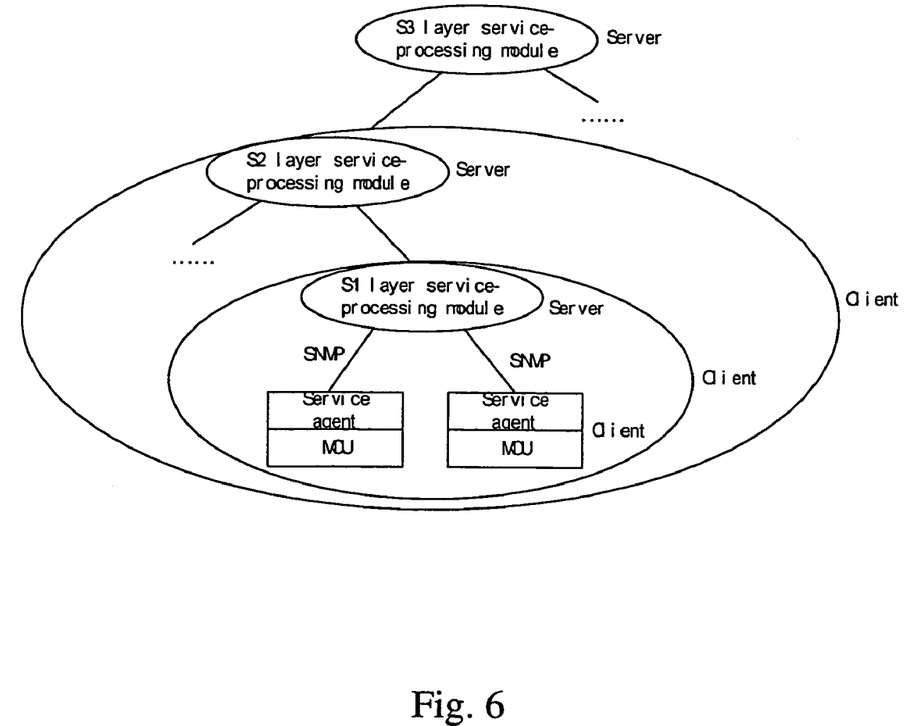
FIG. 6 shows a service-processing module of the service center for second embodiment of the invention.

FIG. 6 shows a service-processing module diagram of a service center. As shown in FIG. 6, the service-processing module takes an expandable multi-layer Client/Server architecture; wherein S1, S2 and S3 represent different layers. Logically, the S3 layer service-processing module takes S2 layer service-processing module as a client, the S2 layer service-processing module takes S1 layer service-processing module as a client, and the S1 layer service-processing module take the MCUs as clients and communicates with them in SNMP protocol.

The Client/Server architecture makes a videoconferencing system easily expandable to manage more MCUs. The higher layer service-processing modules (layers S2 and S3) can also convert different protocols; therefore different communication networks, such as ISDN network and IP network can be connected together so that a videoconferencing network can be formed.

As mentioned above, with a Web server a videoconferencing system can open service to the public and operate automatically.

The embodiments mentioned above are only used to describe the invention and not used to limit the invention. Those skilled in the art should understand that any modification, revision or replacement within the spirit and scope of the invention would be contained in the Claims of the invention.

The invention claimed is:

1. A videoconferencing service operating method, in which Multipoint Control Units (MCUs) are connected with videoconferencing terminals through a communication network, comprising:

connecting the MCUs with a service center through a computer network, the service center comprising a Web server adapted to receive videoconferencing service requests, and a Service-Processing Module adapted to receive subscriber information from the Web server, dispatch resources of the MCUs and drive videoconferencing service;

providing subscriber management facilities by the Web server, through which a service provider manages subscribers including subscriber registration, subscriber profile update, subscriber deletion and subscriber profile interrogation.

2. The videoconferencing service operating method according to claim 1, further comprising, deploying a Simple Network Management Protocol (SNMP) for communication between the service center and the MCUs.

3. The videoconferencing service operating method according to claim 1, further comprising, deploying an expandable multi-layer Client/Server architecture in the service-processing module.

4. The videoconferencing service operating method according to claim 1, further comprising, deploying a Socket with hold mode to connect the Web server and the service center.

5. The videoconferencing service operating method according to claim 1, further comprising following steps of:
(a) visiting the Web server with a browser to make a videoconference reservation;
(b) sending the said videoconference reservation to the service-processing module by the Web server; initiating a dispatching procedure by the service-processing module; if the said dispatching procedure is failure, a failure message of the said videoconference reservation being sent to the said Web server;
(c) at starting time of the videoconference defined by a subscriber before, informing MCUs related to the videoconference of convening the videoconference;
(d) at ending time of the videoconference, informing the said MCU of ending the videoconference by the service-processing module.

6. The videoconferencing service operating method according to claim 1, further comprising, in the Web server, creating a subscriber account number based on the subscriber request, and providing services including password updating, billing interrogation, to the subscriber.

7. The videoconferencing service operating method according to claim 1, further comprising, in the Web server, providing videoconference site management facilities with a videoconference site profile that is defined beforehand and stored in the said database; when a videoconference is to be convened by a subscriber, selecting videoconference sites to attend the videoconference from the said database.

8. The videoconferencing service operating method according to claim 1, further comprising, in the Web server, providing videoconferencing management facilities that can perform states transition among a videoconference state not to be dispatched, a videoconference state having been successfully dispatched, a videoconference state being convened, a videoconference being ended and a videoconference being interrupted.

9. The videoconferencing service operating method according to claim 1, further comprising, in the Web server, providing videoconferencing charging management facilities that have videoconference charging service for a service provider and billing interrogation for a subscriber.

10. The videoconferencing service operating method according to claim 1, further comprising, in the Web server, providing internal notice board used for a system administrator to broadcast messages to an assistant and a external notice board used for the system administrator to broadcast messages to subscribers.

11. A service center used for videoconferencing service operation comprises
a Web server adapted to receive a videoconferencing service request, and provide subscriber management facilities by which a service provider manages subscribers including subscriber registration, subscriber profile update, subscriber deletion and subscriber profile interrogation, and
a service-processing module adapted to receive subscriber information sent by the Web server and dispatch resources of Multipoint Control Units (MCUs).

12. The service center used for videoconferencing service operation according to claim 11, further comprises connection between the said Web server and the said server center is a socket with hold mode.

13. The service center used for videoconferencing service operation according to claim 11, further comprises communication between the service-processing module and MCUs deploys SNMP.

14. The service center used for videoconferencing service operation according to claim 11, wherein the service-processing module includes: a resource management module, a videoconference management module, a videoconference site management module, a subscriber management module and a charging module.

15. The service center used for videoconferencing service operation according to claim 11, wherein the service-processing module deploys an expandable multi-layer Client/Server architecture.

16. A videoconferencing service system, comprising:
videoconferencing terminals;
Multipoint Control Units (MCUs) which are connected with a communication network;
a service center, adapted to connect with MCUs through a computer network; wherein
the service center comprises
a Web server adapted to receive a videoconferencing service request and provide subscriber management facilities by which a service provider manages subscribers including subscriber registration, subscriber profile update, subscriber deletion and subscriber profile interrogation, and
a service-processing module adapted to receive subscriber information sent by the Web server and dispatch resources of MCUs.

17. The videoconferencing service system according to claim 16, further comprises, communication between the service center and the MCUs deploys SNMP protocol.

18. The videoconferencing service system according to claim 16, wherein the service-processing module deploys an expandable multi-layer Client/Server architecture.

* * * * *